United States Patent
Saito et al.

(10) Patent No.: US 9,038,932 B2
(45) Date of Patent: May 26, 2015

(54) APPARATUS AND METHOD FOR FUELIZING INFLAMMABLE WASTE

(75) Inventors: Shinichiro Saito, Sakura (JP); Hajime Wada, Sakura (JP)

(73) Assignee: Taiheiyo Cement Corporation, Tokyo (JP)

( * ) Notice: Subject to any disclaimer, the term of this patent is extended or adjusted under 35 U.S.C. 154(b) by 383 days.

(21) Appl. No.: 13/057,997

(22) PCT Filed: Aug. 5, 2009

(86) PCT No.: PCT/JP2009/063852
§ 371 (c)(1),
(2), (4) Date: Mar. 9, 2011

(87) PCT Pub. No.: WO2010/016513
PCT Pub. Date: Feb. 11, 2010

(65) Prior Publication Data
US 2011/0147500 A1 Jun. 23, 2011

(30) Foreign Application Priority Data

Aug. 8, 2008 (JP) ................................. 2008-204921
Mar. 12, 2009 (JP) ................................. 2009-059484
May 12, 2009 (JP) ................................. 2009-115344

(51) Int. Cl.
*B02C 18/00* (2006.01)
*B02C 18/14* (2006.01)
(Continued)

(52) U.S. Cl.
CPC .......... *B02C 18/0084* (2013.01); *B02C 18/146* (2013.01); *B02C 21/00* (2013.01);
(Continued)

(58) Field of Classification Search
CPC  B02C 25/00; B02C 2201/06; B02C 18/0084; B02C 18/0092
USPC ......... 241/65, 73, 78, 101.2, 152.1, 155, 175, 241/185.5, 189.1
See application file for complete search history.

(56) References Cited

U.S. PATENT DOCUMENTS 4,179,074 A * 12/1979 Flavel .......................... 241/24.1
5,429,310 A * 7/1995 Keller et al. .................... 241/14
(Continued)

FOREIGN PATENT DOCUMENTS

JP 59199058 A 11/1984
JP 7300355 A 11/1995
(Continued)

OTHER PUBLICATIONS

Written Opinion of the ISA for PCT/JP2009/063852. 6 Pages.
(Continued)

*Primary Examiner* — Shelley Self
*Assistant Examiner* — Matthew G Katcoff
(74) *Attorney, Agent, or Firm* — Stetina Brunda Garred & Brucker (57) ABSTRACT

In accordance with the present invention, there is provided an apparatus for fuelizing inflammable waste capable of efficiently fuelizing inflammable waste while reducing facility and operation costs of the overall system and maintaining stable operation, and so on. More particularly, the apparatus 1 for fuelizing inflammable waste comprises: a primary crusher 4 for crushing an inflammable waste W containing as principal component at least one selected from a group comprising plastics, sponges, fibers, rubbers and wood materials; a foreign matter removing device 7 for removing foreign matters F contained in the crushed objects W1; a secondary crusher 9 for secondarily crushing the crushed objects W3 from which foreign matters I, M are removed; and an injecting device 11 for injecting the secondarily crushed objects W4 generated by the secondary crusher 9 into a burner 10, and so on. The apparatus 1 may be provided with an intermediate tank 8 for storing the crushed objects W3 from which foreign matters I, M are removed, and from the intermediate tank 8 is supplied the crushed objects W3 to the secondary crusher 9.

11 Claims, 4 Drawing Sheets

(51) Int. Cl.
 *B02C 21/00* (2006.01)
 *B02C 23/08* (2006.01)
 *B03B 9/06* (2006.01)
 *B03C 1/03* (2006.01)
 *B03C 1/06* (2006.01)
 *C10L 5/48* (2006.01)
 *F23G 5/02* (2006.01)

(52) U.S. Cl.
 CPC .................. *B02C 23/08* (2013.01); *B03B 9/06* (2013.01); *B03C 1/03* (2013.01); *B03C 1/06* (2013.01); *B03C 2201/20* (2013.01); *C10L 5/48* (2013.01); *F23G 5/02* (2013.01); *F23G 2201/602* (2013.01); *F23G 2201/80* (2013.01); *Y02E 50/30* (2013.01)

(56) References Cited

U.S. PATENT DOCUMENTS

| | | | | |
|---|---|---|---|---|
| 5,797,548 A * | 8/1998 | Tamura et al. | | 241/35 |
| 5,992,774 A * | 11/1999 | Oh | | 241/20 |
| 6,595,443 B2 * | 7/2003 | Ottergren | | 241/29 |
| 7,264,124 B2 * | 9/2007 | Bohlig et al. | | 209/30 |
| 2002/0079392 A1* | 6/2002 | Tango et al. | | 241/79 |

FOREIGN PATENT DOCUMENTS

| | | |
|---|---|---|
| JP | 11226555 A | 8/1999 |
| JP | 2000342987 A | 12/2000 |
| JP | 2003286497 A | 10/2003 |

OTHER PUBLICATIONS

International Search Report or PCT/JP2009/063852. 2 Pages.
English Abstracts of Japanese references. 4 Pages.

* cited by examiner

APPARATUS AND METHOD FOR FUELIZING INFLAMMABLE WASTE

CROSS-REFERENCE TO RELATED APPLICATIONS

The present application claims priority to International Application No. PCT/JP2009/063852 filed on Aug. 5, 2009, which claims priority to Japanese Patent Application No. 2008-204921 filed on Aug. 8, 2008, Japanese Patent Application No. 2009-59484 filed on Mar. 12, 2009, and Japanese Patent Application No. 2009-115344 filed on May 12, 2009.

STATEMENT RE: FEDERALLY SPONSORED RESEARCH/DEVELOPMENT

Not Applicable

BACKGROUND OF THE INVENTION

1. Technical Field of the Invention

The present invention relates to an apparatus and a method for fuelizing inflammable waste, and more particularly to an apparatus and the like used for utilizing wastes containing inflammable material such as plastics.

2. Description of the Related Art

It has been used techniques of grinding inflammable wastes such as waste plastics to less or equal to some degree of sizes and fuelizing the ground inflammable wastes. When using such singly ground plastics as a substitute fuel for combustion device using pulverized coal, heavy oil and so on, however, the ground plastics are liable to cause landing combustion, consequently deteriorating the quality of burnt product. Then, in order to prevent the landing combustion, the grinding can be more finely carried out. However, in such a case, excessive grinding may occur, which causes remarkable enhancement of grinding cost especially in plastics that are difficult to grind.

Therefore, the present applicant proposed a method for fuelizing plastics, as described in Patent document 1, in accordance with knowledges that crushed plastics blown from a cement kiln front stay in the cement kiln for approximately 2 seconds at approximately 800 to 1600°, and burn up time of the crushed plastics varies with weight and surface area thereof so that plastics with larger surface area are burnt for a shorter burn up time, and so on. In this method, plastics are crushed to be 200 $cm^2$/g or more in specific surface area as well as 0.01 g or more and 0.1 g or less in weight, and the crushed plastics are burnt in a combustion furnace of 800° or more, which allows the crushed plastics to completely be burnt within a stay time in the cement kiln space on the whole by regulating its shape factor even though grinding or breakage is stopped to a specific weight, resulting in burnt product with good property.

On the other hand, in order to obtain crushed plastics used for burning in combustion furnaces or the like, variety of crushers are used, however, in consideration of operational troubles such as breakage of rotary blades and others of the crushers and clogging of screens, in Patent document 2 is proposed a crushing device that uses a one-shaft-rotor-type rotary crusher, in which rotary blades and fixed blades disposed in the crusher crush waste plastics, and crushed waste plastics are discharged through a screen, and the crushed waste plastics are discharged with vertically sucked air in the crusher while rotating the rotary blades at low velocity between 60 rpm and 150 rpm, and so on.

Further, to the inflammable waste are mixed non-ferrous foreign matters such as sands, stones, glasses, copper and aluminum, and iron-based foreign matters, which causes fluctuation of calorific value when burnt in a burner or the like, so that the foreign matters should be removed in advance. In addition, these foreign matters may cause the breakage of crushing blades at crushing processing, which causes increase in maintenance cost and reduction in operational rate. Therefore, in conventional methods of fuelizing inflammable waste, brought-into inflammable wastes were primarily crushed as well as foreign matters such as metals were removed from the primarily crushed objects, after that, they were secondarily crushed so as to be used as a fuelized matters.

Figure 5:
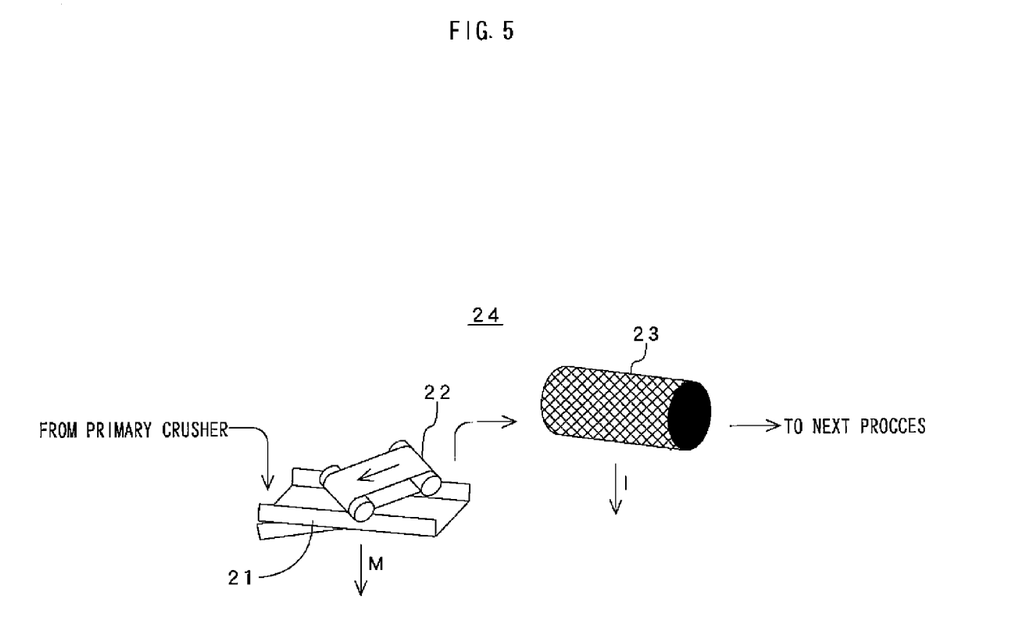
FIG. 5 is a schematic configuration view showing an example of a conventional foreign matter removing device.

In this case, in order to remove foreign matters such as metals, a foreign matter removing device as shown in FIG. 5 is used. The foreign matter removing device 24 is composed of a magnetic ore dressing machine 22 mounted above a vibrating conveyor 21, and a screen 23 disposed downstream of the magnetic ore dressing machine 22, and from crushed objects of flammable wastes such as plastics, sponges, fibers, rubbers, wood materials and construction-based wastes are removed iron-based foreign matters M by the magnetic ore dressing machine 22, and non-ferrous foreign matters I such as sands, stones, glasses, copper and aluminum are removed through the screen 23.

Then, fuelized matters obtained by secondary crushing after removing foreign matters were transported to a tank mounted near a front portion of a rotary kiln and were stored therein, and appropriately, the fuelized matters were supplied to a burner and were blown into the rotary kiln while required amount being measured.

Patent document 1: Japanese Patent Publication 2001-181658 gazette

Patent document 2: Japanese Patent Publication 2007-190481 gazette

SUMMARY OF THE INVENTION

In the method of fuelizing plastics described in the Patent document 1, plastics are crushed to be 200 cm2/g or more in surface area as well as 0.01 g or more and 0.1 g. or less in weight, however, it is not easy to crush plastics in such a manner that the weight of the crushed plastics in a predetermined range while maintaining surface area thereof more or equal to a predetermined range, therefore, it leaves room for improvement.

In addition, in the device for crushing waste plastics described in the Patent document 2, the rotary blades rotates at low velocity between 60 rpm and 150 rpm, so that it takes long time to obtain crushed objects as a problem.

Further, the conventional foreign matter removing device 24 is separately provided with the sorting devices 22, 23 to remove the iron-based foreign matter M and the non-ferrous foreign matter I respectively, which makes it necessary to secure wide area for installing the devices, and facility and operation costs become high as well.

Still further, in the conventional fuelizing methods, in order to inject fuelized material from a burner at a fixed rate without interrupted, it becomes necessary to install a large volume tank capable of securing sufficient storage capacity as a tank for storing secondarily crushed objects, which increases costs for the tank and its peripheral facilities, resulting in considerably high facility cost of the overall system.

The present invention has been made in consideration of the problems in the conventional art, and the object thereof is to provide an apparatus for fuelizing inflammable waste capable of efficiently fueling inflammable waste while reducing facility and operation costs of the overall system and maintaining stable operation, and so on.

To achieve the above object, the present invention relates to an apparatus for fueling inflammable waste, and the apparatus is characterized by comprising: a primary crusher for crushing an inflammable waste containing as principal component at least one selected from a group comprising plastics, sponges, fibers, rubbers and wood materials; a foreign matter removing device for removing foreign matters contained in the crushed objects; a secondary crusher for secondarily crushing the crushed objects from which foreign matters are removed; and an injecting device for injecting the secondarily crushed objects into a burner.

Here, the plastics are high-molecular weight polymers and can be formed as fluent body when melting, and the plastics includes polymers to which fillers, plasticizers, stabilizers, pigments and others are added. The sponges are matters in which synthetic resin and others are made like sponges. The fibers are matters made of natural fibers and chemical fibers and show forms of cloth-like, string-like, thread-like and cotton-like bodies. The rubbers are matters with property that substantially instantly returns to original shape when external force is added thereto and removed therefrom, and are natural rubbers, synthetic rubbers synthesized from oil, regenerated rubbers, and so on. The wood materials are made of wood such as waste wood and waste of woody part.

With the present invention, since an inflammable waste containing plastics and the like as a principal component is crushed by the primary crusher, and foreign matters are removed by the foreign matter removing device, after that, the crushed objects are secondarily crushed by the secondary crusher, and the secondarily crushed objects are injected into the burner through the injecting device, so that it becomes possible to use inflammable waste as a fuel while restraining the fluctuation of calorific value when used as a fuel and maintaining stable operation, in addition, breakage of the blades for crushing or the like may be prevented.

The above apparatus for fueling inflammable waste may further comprise an intermediate tank for storing the crushed objects from which foreign matters are removed by the foreign matter removing device, wherein the crushed objects from which foreign matters are removed can be supplied from the intermediate tank to the secondary crusher. Controlling the level of the intermediate tank or the like is able to stably and continuously supply the crushed objects from which foreign matters are removed to the secondary crusher.

Further, the primary crusher may have rotary blades mounted on a rotary shaft in a main body in multiple stages in an axial direction of the rotary shaft, fixed blades fixed in the main body and a screen disposed below the rotary blades, and the primary crusher can crush the inflammable waste with the rotary blades and the fixed blades, and can downwardly discharge crushed objects thorough the screen, and at the crushing of the inflammable waste, the primary crusher can be driven under following conditions: a velocity of the rotary blades being not less than 20 rpm and not more than 60 rpm; a phase difference of the rotary blades in two adjacent stages being not more than 60°; sieve openings of the screen being not less than 30 mm and not more than 200 mm; and a distance between the screen and the rotary blades being not less than 20 mm and not more than 100 mm.

Still further, the secondary crusher may have rotary blades mounted on a rotary shaft in a main body, fixed blades fixed in the main body and a screen disposed below the rotary blades, and the secondary crusher may secondarily crush the crushed objects from which foreign matters are removed with the rotary blades and the fixed blades, and can downwardly discharge the secondarily crushed objects thorough the screen, and at the secondary crushing of the crushed objects, the secondary crusher may be driven under following conditions: a velocity of the rotary blades being not less than 60 rpm and not more than 600 rpm; sieve openings of the screen being not less than 5 mm and not more than 20 mm; and a distance between the screen and the rotary blades being not less than 10 mm and not more than 50 mm.

The fueling apparatus can be provided with a vibrating conveyor having a filtering function, on a conveying face, of filtering conveyed objects by allowing objects smaller than a predetermined size to drop, and a magnetic ore dressing machine, situated above the vibrating conveyor, for removing iron-based foreign matters with a magnet. The vibrating conveyor has a function of selecting transported objects in accordance with size, so that the vibrating conveyor and the magnetic ore dressing machine are able to remove all the ferrous and non-ferrous foreign matters, which makes it unnecessary to separately install a screen downstream of the magnetic ore dressing machine as in a conventional fueling apparatus. As a result, it is possible to manage even when space for installing the foreign matter removing device is small, which decreases facility and operation costs.

In the above foreign matter removing device, on the conveying face can be arranged a screen, a porous plate or a plate-like member with plurality of slits. Using the general-purpose member allows the device cost of the vibrating conveyor, in its turn the cost of the foreign matter removing device to be reduced.

In the foreign matter removing device described above, when on the conveying face is arranged the screen, sieve openings of the screen can be not less than 1 mm and not more than 50 mm. When the porous plate is arranged, diameters of pores drilled in the porous plate can be not less than 1 mm and not more than 50 mm. When the plate-like member with plurality of slits is arranged, a width of each slit may be not less than 1 mm and not more than 50 mm. Using the foreign matter removing device with these vibrating conveyors allows foreign matters to efficiently be removed when wastes such as ASR are injected into a cement kiln from a burner of the kiln, which lengthens lives of crushers and the like arranged downstream of the foreign matter removing device.

In addition, the present invention relates to a method of fueling inflammable waste, and the method is characterized by comprising the steps of: crushing an inflammable waste containing as principal component at least one selected from a group comprising plastics, sponges, fibers, rubbers and wood materials with a primary crusher; removing foreign matters contained in the crushed objects; secondarily crushing the crushed objects from which foreign matters are removed with a secondary crusher; and injecting the secondarily crushed objects into a burner. With the present invention, foreign matters are removed before injected into the burner, so that it becomes possible to efficiently use inflammable waste while restraining the fluctuation of calorific value when used as a fuel and maintaining stable operation.

In the method for fueling inflammable waste as described above, the inflammable waste can be crushed by the primary crusher to not more than 200 mm in major axis average diameter; foreign matters contained in the crushed objects are removed by the foreign matter removing device; the crushed objects from which foreign matters are removed are secondarily crushed to not more than 15 mm in major axis average diameter; and injecting the secondarily crushed objects into the burner.

Further, in the above-mentioned method for fuelizing inflammable waste, water content of the crushed objects can be adjusted to not more than 5 mass %, and then the crushed objects can be supplied to the secondary crusher such that power of the secondary crusher is maintained constant. With this, crushed objects can stably be injected into the burner while preventing clogging of the secondary crusher.

It is possible to inject the secondarily crushed objects into the burner immediately after the crush, which allows a large volume storage means for storing the crushed objects to be unnecessary, resulting in decreased facility cost.

In the method for fuelizing inflammable waste as described above, the secondarily crushed objects may be injected into the burner together with other fuels, and calorific value, which is generated by burning the secondarily crushed objects and other fuels supplied from the burner, can be controlled by increasing or decreasing amount of the other fuels injected. With this, the inflammable waste may be utilized as much as possible while securing required calorific value.

The above method for fuelizing inflammable waste may further comprise the steps of: temporarily storing the crushed objects from which foreign matters are removed in storing means; and drawing required amount of the crushed objects form the storing means and feeding the crushed objects to the secondary crusher, wherein amount of the inflammable waste fed to the primary crusher can be controlled in accordance with amount of the crushed objects stored in the storing means. With this, the amount of crushed objects stored in the storage means is maintained, and the crushed objects can stably be supplied to the secondary crusher.

The method for fuelizing inflammable waste described above may further comprise the steps of: temporarily storing the crushed objects from which foreign matters are removed in storing means; and drawing required amount of the crushed objects from the storing means and feeding the crushed objects to the secondary crusher, wherein running velocity of the primary crusher can be controlled in accordance with amount of the crushed objects stored in the storing means, which can adjust the velocity of crushing processing at the primary crusher so as not to excessively increase the amount of crushed objects generated.

In the method for fuelizing inflammable waste, amount of the crushed objects fed to the secondary crusher can be controlled in accordance with load current of the secondary crusher, which can prevent overload of the secondary crusher.

In the method for fuelizing inflammable waste, air volume for drawing the secondarily crushed objects generated by the secondary crusher into the burner can be controlled in accordance with amount of the crushed objects drawn from the storing means, which makes it possible to prevent air ratio from remarkably fluctuating when the crushed objects are supplied to the burner and to reduce power consumption of devices for inducing air volume.

In the above-mentioned method for fuelizing inflammable waste, bulk density of the secondarily crushed objects generated by the secondary crusher can be not less than 0.03 kg/L and not more than 0.20 kg/L, preferably not less than 0.06 kg/L and not more than 0.10 kg/L. And, averaged major axis diameter of the secondarily crushed objects generated by the secondary crusher may be not less than 3 mm and not more than 15 mm, preferably not less than 5 mm and not more than 10 mm, and maximum value may be not more than 25 mm. With this, when the crushed objects are used as a fuel for burners, the crushed objects are liable to be ignited and burn out in a short period of time, so that it can preferably be utilized as a fuel.

In the method for fuelizing inflammable waste described above, the secondarily crushed objects can be injected into the burner at not less than 0.4 Nm$^\square$/kg and not more than 3.0 Nm$^\square$/kg in air quantity per unit mass. With this, the crushed objects can be used in the same manner as a main fuel, efficiently reducing the amount of fossil fuel used.

The method for fuelizing inflammable waste described above may further comprise the steps of: compressing the removed foreign matters by rollers; crushing inorganic objects contained in the compressed foreign matters; and collecting thinned metals contained in the compressed foreign matters with an eddy current separator. Collecting the thinned metals as a resource and separately processing the inorganic objects allow wastes that cannot be utilized as a fuel to efficiently be processed.

As described above, with the present invention, it becomes possible to efficiently fuelize inflammable wastes while reducing facility and operation costs of the overall system and maintaining stable operation.

DETAILED DESCRIPTION OF THE INVENTION

Figure 1:
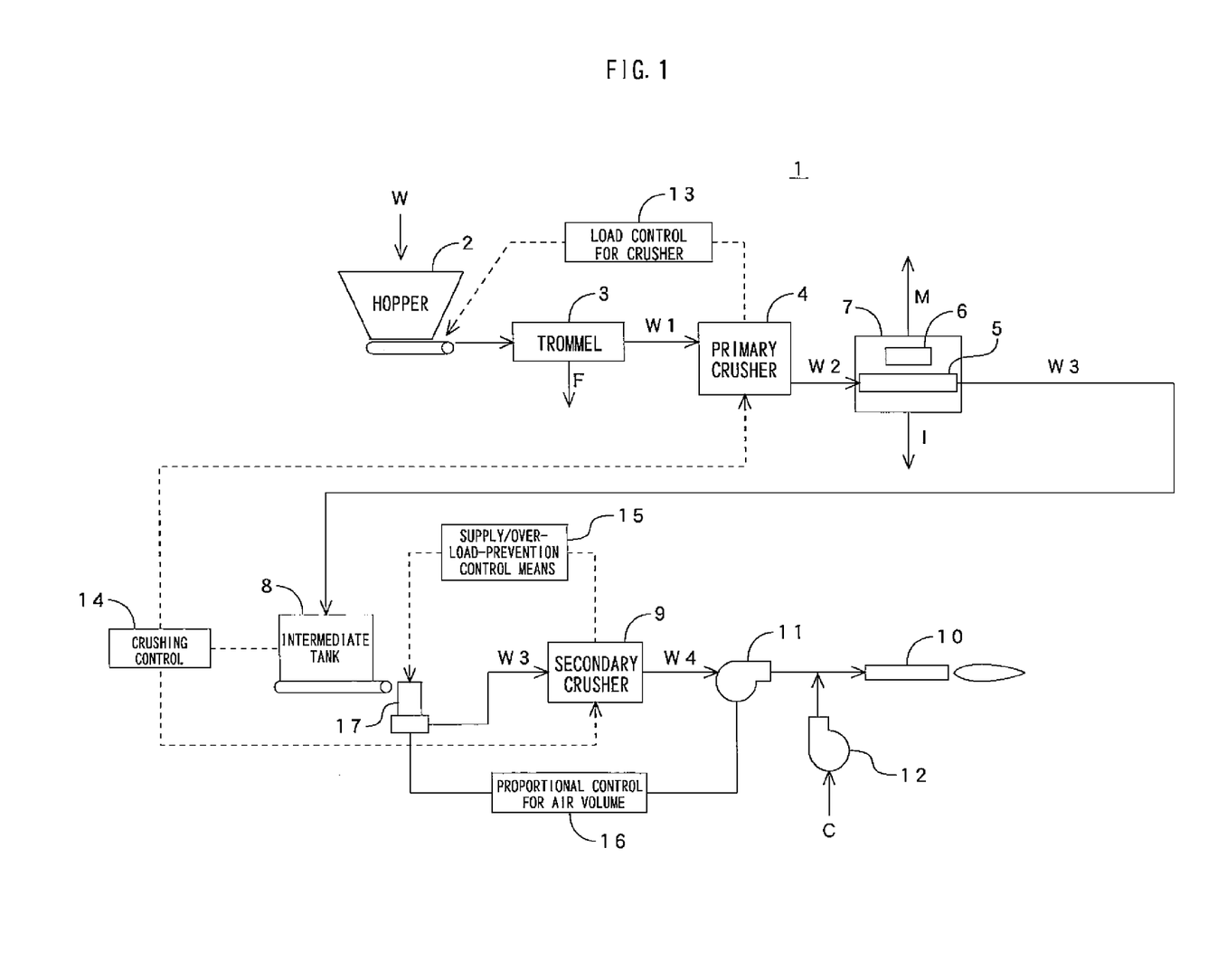
FIG. 1 is an overall configuration view of an apparatus for fuelizing inflammable waste according an embodiment of the present invention.

Next, embodiments of the present invention will be explained with reference to drawings. In FIG. 1, solid lines show flows of inflammable wastes, and dotted lines show flows of electrical signals such as control signals.

FIG. 1 shows an inflammable waste fuelizing apparatus according to an embodiment of the present invention, and the fuelizing apparatus 1 is provided with a hopper 2 for receiving an inflammable waste W; a trommel 3 for removing foreign matters F such as sands, stones and glasses contained in the inflammable waste W supplied from the hopper 2; a primary crusher 4 for crushing the inflammable waste W1 from which foreign matters are removed; a foreign matter removing device 7, which is composed of a vibrating conveyor 5 and a magnetic ore dressing machine 6, for removing foreign matters from crushed object W2 after the primary crushing; an intermediate tank 8 for temporarily storing crushed objects W3 from which foreign matters are removed; a secondary crusher 9 for secondarily crushing the crushed objects W3 from the intermediate tank 8; a primary fan 11 for injecting secondarily crushed objects W4 into a kiln burner 10; and a secondary fan 12 for injecting pulverized coal C as a main fuel into the kiln burner 10.

The inflammable waste fuelizing apparatus 1 is provided with, as variety of control means, a load control means 13 for crusher for controlling amount of the inflammable waste W discharged from the hopper 2 in accordance with a load of the primary crusher 4; a crushing control means 14 for switching operation/stop of the primary crusher 4 and the secondary crusher 9 in accordance with a material level of the intermediate tank 8; a supply/over-load-prevention control means 15 for controlling amount of the crushed objects W3 discharged from the intermediate tank 8 in accordance with a load of the secondary crusher 9; and a proportional control means 16 for air-volume for controlling air volume of the primary fan 11 in accordance with the amount of the crushed objects W3 discharged from the intermediate tank 8.

The hopper 2 is mounted to receive the brought-into inflammable waste W and to feed it to a downward device while adjusting feed rate thereof. Here, the inflammable wastes W are wastes containing inflammable matters such as plastics, sponges, fibers, rubbers and wood materials, for instance, construction-based wastes, heat retaining material of whiteware house appliance devices and automobile shredder dusts, and so on.

The construction-based wastes are wastes associated with construction, reforming and demolition works of buildings. And, the heat retaining material of whiteware house appliance devices is waste urethane and the like that are generated when waste refrigerator is decomposed. Further, the automobile shredder dusts are called ASR, and are pieces of plastics, glasses and rubbers and others that are disposed as industrial wastes after carcass of scrapped car, which remains after removing engines and others from waste automobiles, are smashed into pieces by industrial shredders and iron and others are recovered therefrom.

The trommel 3 is installed to remove foreign matters F such as sands, stones and glasses of large particle size (for instance 20 mm or more), which are contained in the inflammable waste W, which lengthens the lives of blades of the secondary crusher 9 and makes it possible to obtain an excellent combustibility fuel without foreign matters.

The primary crusher 4 is installed to crush the inflammable waste W1 from which the foreign matters F of large particle size are removed by the trommel 3 below 200 mm in major axis diameter, which lengthens the lives of blades of the secondary crusher 9 and makes it possible to obtain an excellent combustibility fuel without foreign matters.

Figure 2:
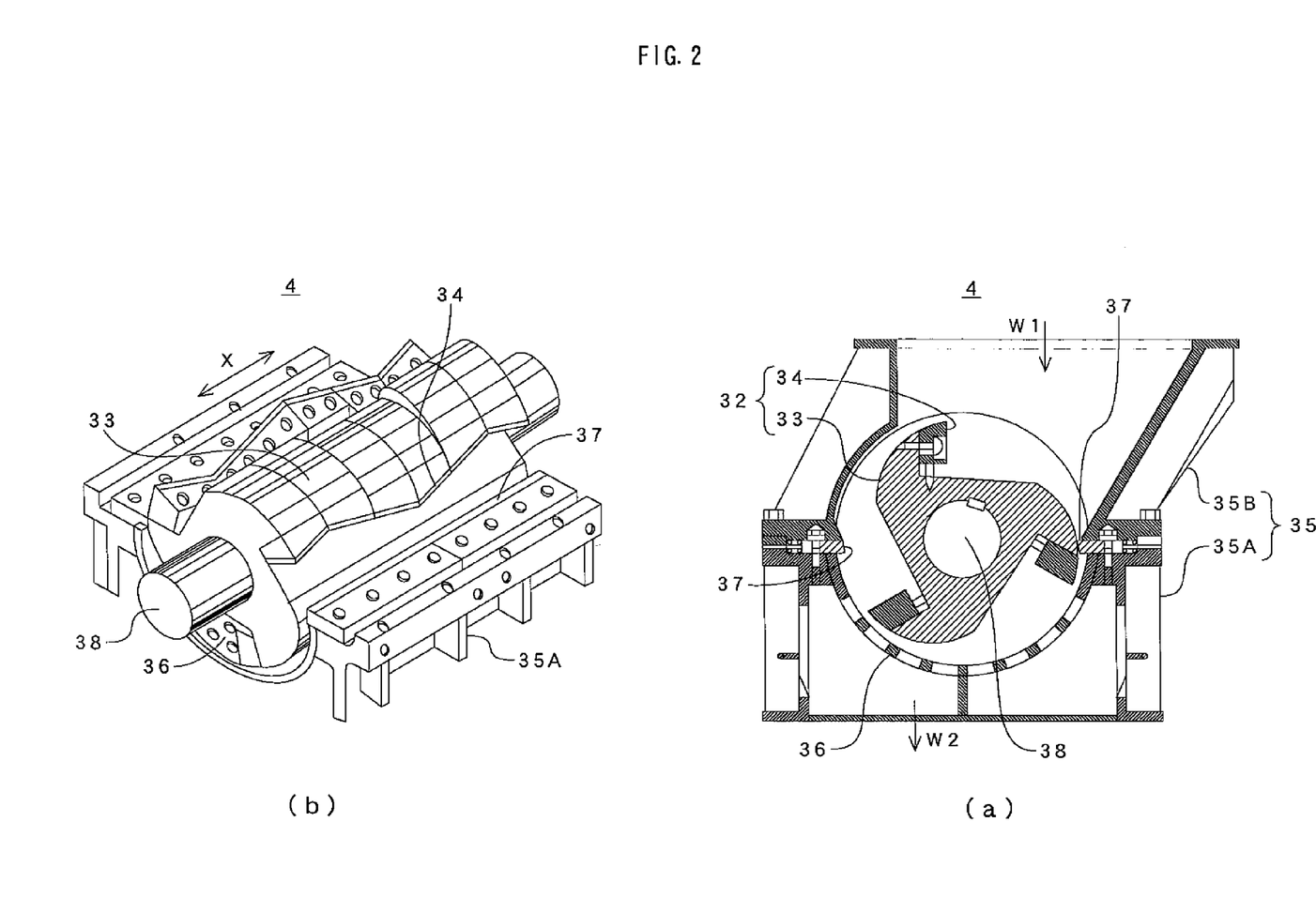
FIG. 2(a) is a cross-sectional view showing a primary crusher of the fuelizing apparatus shown in FIG. 1.
FIG. 2(b) is an exploded perspective view of the primary crusher of the fuelizing apparatus shown in FIG. 2(a).

As the primary crusher 4 is preferably used a one-shaft-rotor-type rotary crusher EH-6090 and so on made by HORAI Co, Ltd. This primary crusher 4 is, as shown in FIG. 2, provided with, in a main body 35 (35A, 35B) that can vertically be divided into two parts, a rotary blades 32 composed of a shank 33 and blades 34, a pair of fixed blades 37 that are oppositely arranged with each other, a semi-cylindrical screen 36 situated below the rotary blades 32, and so on.

The rotary blades 32 are composed of the shank 33 as a base and the blades 34 fixed to the shank 33 through bolts, and rotates in the main body 35 through a reduction gear (not shown). A tip of the blade 34 becomes a helical cutter that is inclined against the axial direction (direction indicated by the arrow X) of the rotary shaft 38. In addition, the blades 34 are arranged in multiple stages in an axial direction of the rotary shaft 38, and a phase difference is given to the rotary blades 32 in two adjacent stages, and the phase difference is set to be not more than 60°. The reason why the phase difference is given to the rotary blades 32 is that an impact added to the rotary blades 32 is released to avoid overload of the primary crusher 4.

A pair of fixed blades 37 opposing the rotary blades 32 are protrudably attached to divided faces of the main body 35. To a lower discharge zone of the main body 35 is mounted a semi-cylindrical screen 36 determining sizes of crushed objects with sieve opening sizes.

With the primary crusher 4 with the above-mentioned construction, at crushing, it is preferable to set the velocity of the rotary blades 32 to be not less than 20 rpm and not more than 60 rpm; the sieve openings of the screen 32 to be not less than 30 mm and not more than 200 mm; and a distance between the screen and the rotary blades to be not less than 20 mm and not more than 100 mm.

With the construction described above, the inflammable waste W1 thrown from an upper portion of the main body 35B is taken by the rotary blades 32, and can be crushed through shearing forces acting between the tips of the blades 34 and the fixed blades 37. At this time, objects reaching below sieve openings of the screen 36 are discharged downward through the sieve openings, and crushed objects larger or equal to the sieve openings are lifted upward by the rotary blades 32 and repeatedly crushed.

Figure 3:
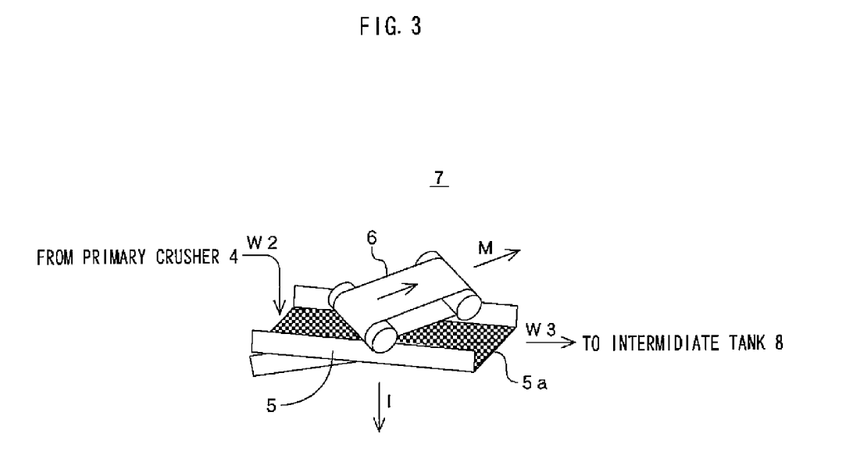
FIG. 3 is a schematic configuration view showing a foreign matter removing device of the fuelizing apparatus shown in FIG. 1.

Returning to FIG. 1, the foreign matter removing device 7 is installed to remove the non-ferrous foreign matters I such as glass, copper and aluminum, and the iron-based foreign matters M from the crushed objects W2 crushed by the primary crusher 4. This foreign matter removing device 7 is, as shown in FIG. 3, composed of the vibrating conveyor 5 and the magnetic ore dressing machine 6, and on a conveying face of the vibrating conveyor 5 is provided a screen 5a, and above the screen 5a is disposed the magnetic ore dressing machine 6. Sieve openings of the screen 5a are set to be not less than 1 mm and not more than 50 mm. The vibrating conveyor 5 is required to be made of stainless steel or the like so as not to be magnetized by the magnetic ore dressing machine 6.

In this connection, on the conveying face of the vibrating conveyor 5 is, other than the screen 5a, a porous plate or a plate-like member with plurality of slits may be arranged. When arranging the porous plate, diameters of pores drilled in the porous plate are set to be not less than 1 mm and not more than 50 mm, and when arranging the plate-like member with plurality of slits, a width of each slit is set to be not less than 1 mm and not more than 50 mm, which allows almost the same effect to be obtained as arranging the screen 5a.

Returning to FIG. 1, the intermediate tank 8 is installed to temporarily store the crushed object W3 subject to the primary crushing and foreign matters removal upstream of the secondary crusher 9. To this intermediate tank 8 is attached a weigher 17 such as an autofeeder for adjusting amount of the crushed object W3 discharged from the intermediate tank 8.

Figure 4:
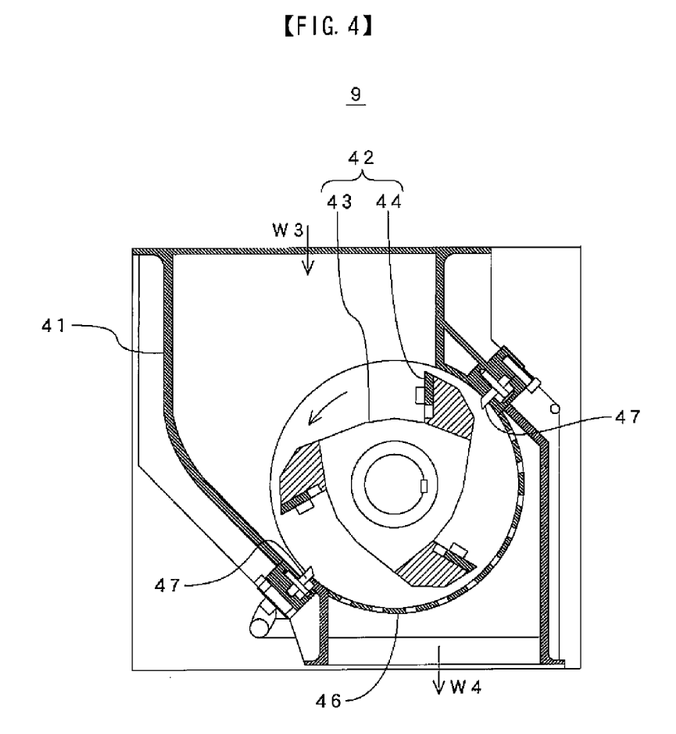
FIG. 4 is a schematic cross-sectional view showing a secondary crusher of the fuelizing apparatus shown in FIG. 1.

The secondary crusher 9 is mounted to secondarily crush the crushed object W3 supplied from the intermediate tank 8 below 15 mm in major axis average diameter to manufacture a fuel. As the secondary crusher 9 is used a one-shaft-high-velocity-shearing-type crusher A-561 J-type made by HORAI Co, Ltd, and so on. This secondary crusher 9 is, as shown in FIG. 4, composed of, in a main body 41, rotary blades 42 composed of a shank 43 and blades 44, a pair of fixed blades 47, a semi-cylindrical screen 46 situated below the rotary blades 42, and so on.

The rotary blades 42 are open cutters divided into small blocks, and the blades 42 are strong with high-performance cooling effect (heat generation preventing effect).

In this secondary crusher 9, crushed objects thrown from the upper portion of the main body 41 are crushed through shearing forces acting between the blades 44 and the fixed blades 47 of the rotary blades 42. At this moment, objects reaching below sieve openings of the screen 46 are discharged downward through the sieve openings, and crushed objects larger or equal to the sieve openings are lifted upward by the rotary blades 42 and repeatedly crushed.

Next, a method of fuelizing inflammable waste according to the present invention using the fuelizing apparatus 1 with the above construction will be explained mainly with reference to FIG. 1.

Received inflammable waste W is discharged from the hopper 2, and is thrown into the trommel 3 to remove foreign matters such as sands, stones and glasses. Next, the inflammable wastes W1 from which foreign matters are removed are thrown into the primary crusher 4 to crush below 200 mm in major axial average diameter.

In the above operation, by the load control means 13 for crusher is controlled feed rate of the inflammable waste W from the hopper 2 in such a manner that the load of the primary crusher 4 becomes constant, or operation velocity of the primary crusher 4 is controlled to adjust velocity at the crushing processing to adjust amount of the crushed object W2 generated. Meanwhile, as described above, in the type that the primary crusher 4 is provided with the rotary blades 32, controlling number of rotation of the rotary blades 32 can control operation velocity.

Further, by the crushing control means 14 is controlled operation of the primary crusher 4 and the secondary crusher 9 in accordance with material level of the intermediate tank 8. Concretely, the primary crusher 4 stops at level H, and at an intermediate level between levels L and H is controlled operation velocity of the primary crusher 4 and the secondary crusher 9, and the secondary crusher 9 stops at level L. Operation velocity of the secondary crusher 9 can be controlled by changing number of rotation of the rotary blades 42 also. With this, it can be operated while preventing excessively much generation of the crushed object W3 and excessively low feed rate of the crushed object W3.

In the foreign matter removing device 7, as shown in FIG. 3, when the crushed object W2 is transported by the vibrating conveyor 5, from the sieve openings of the screen 5a (not less than 1 mm and not more than 50 mm) drop and are removed the non-ferrous foreign matters I such as sands, stones, glasses, copper and aluminum, and from the crushed object W2 remaining on the vibrating conveyor 5 are removed the iron-based foreign matter M through the magnetic ore dressing machine 6. The crushed object W3 from which foreign matters are removed is transported to the intermediate tank 8, and is temporarily stored in the intermediate tank 8. The foreign matters removed from the crushed object W2 are collected to separately utilize as a resource again.

This foreign matter removing device 7 is provided with the screen 5a on a conveying face of the vibrating conveyor 5, so that a single processing can remove ferrous and non-ferrous foreign matters (M+I) from the crushed object W2 at the same time, which further reduces space for installation and facility and operation costs. In addition, removing metal wastes, sands and stones before the crushing of the crushed object W3 by the secondary crusher 9 allows chipping and abrasion velocity of the blades 44 and the fixed blades 47 of the secondary crusher 9 to be reduced and the lives of the blades 44 and the fixed blades 47 to be lengthened double or triple.

On the other hand, the non-ferrous foreign matter I removed from the crushed object W2 may be fed to a roll pressing device (not shown) and compressed by rollers. At this time, inorganic objects such as sands, stones and glasses are crushed and metals such as copper and aluminum become thinned metals. Foreign matters subject to the roll compression may be fed to an eddy current separator (not shown), and metals such as copper and aluminum can be recovered as resources, and may separately be processed after separating inorganic objects such as sands, stones and glasses.

In addition, downstream of the foreign matter removing device 7 may be installed a specific gravity separator (not shown). With this, it becomes possible to remove metal pieces of copper or the like acting as a catalyst when dioxins and others are generated from the crushed object W2, which reduces generation of harmful materials and prevents incomplete combustion.

Returning to FIG. 1, through the weigher 17 is drawn the crushed object W3 in the intermediate tank 8 and is supplied to the secondary crusher 9 to secondarily crush the crushed object W3 below 15 mm in major axis average diameter, which allows the crushed object W3 to be fiber-like body (cotton-like body), that is a property easily used as a fuel (easily burnt).

In addition, at the secondary crushing of the crushed object W3 by the secondary crusher 9, it is preferable that after water content of the crushed object W3 is decreased not more than 5 mass %, the crushed object W3 is supplied to the secondary crusher 9 such that the power of the secondary crusher 9 becomes constant. Adjusting the water content not more than 5 mass % allows the crushed object W3 to stably be crushed while preventing clogging of the secondary crusher 9. In this connection, the smaller the number of rotation of the rotary blades 42 of the secondary crusher 9 is, the longer the lives of the rotary blades 42 and the fixed blades 47 become, but, it takes a long time for crushing. And, the sieve openings of the screen 46 should appropriately be changed in accordance with the property of the inflammable waste W received and a desired property of fuel.

The secondarily crushed objects W4 generated as described above are crushed objects of plastics, rubber, fiber-like body, sponge-like body, glass, metal and so on, and the secondarily crushed objects W4 contains more or equal to 50 mass % of the fiber-like body; their bulk density are not less than 0.03 kg/L and not more than 0.20 kg/L; their major axis average diameters are not less than 3 mm and not more than 15 mm (preferably not less than 5 mm and not more than 10 mm); and maximum major axis diameter does not exceed 25 mm. Adjusting the above conditions allows the secondarily crushed objects W4 to be easily ignited and burn out in a short period of time when used as a fuel for the burner.

Meanwhile, the fiber-like body is not limited to the above-mentioned fibers but is defined to be an aggregate of fine thread-like bodies that is obtained by crushing at least one selected from a group comprising plastics, sponges, fibers, rubbers and wood materials described above. Aspect ratio of this fiber-like body is preferably be more or equal to 3 and more preferably be 10 or more.

In case that the bulk density exceeds 20 kg/L, it may cause landing combustion, and the bulk density less than 0.03 kg/L is not preferable since it becomes inefficient on transportation and others. In addition, when the major axis average diameter exceeds 15 mm, fuels are mutually entangled and thereby become masses, which may cause landing combustion, when the major axis average diameter is less than 3 mm, it is not preferable since power required for crushing becomes extremely large.

Next, the secondarily crushed object W4 generated by the secondary crusher 9 is drawn by the primary fan 11, and is injected into the kiln burner 10 together with pulverized coal C supplied through the secondary fan 12 so as to be used as a fuel for the burner. When injected into the kiln burner 10, as a general rule, all of the secondarily crushed object W4 generated by the secondary crusher 9 is injected into the kiln burner 10, and adjustment of required calorific value is performed by increasing or decreasing amount of the pulverized coal C injected. With this, the secondarily crushed object W4 is used as much as possible, and the brought-into inflammable waste W can efficiently be processed.

Further, in the supply/over-load-prevention control means 15, load current of the secondary crusher 9 is detected to adjust amount of the crushed object W3 drawn through the weigher 17. Concretely, as the load current of the secondary crusher 9 becomes large, it is controlled that feed rate of the crushed object W3 to the secondary crusher 9 is reduced to prevent overload of the secondary crusher 9. That is, when the crushed object W3 contains water, it is liable to clog in the secondary crusher 9 in crushing process, so that it is immediately sensed, and feed rate of the crushed object W3 is adjusted to protect the secondary crusher 9. In addition, controlling feed rate of the crushed object W3 to the secondary crusher 9 prevents continuous feed of the secondarily crushed object W4 to the kiln burner 10 from being interrupted.

Along with this, in the proportional control means 16 for air-volume, in accordance with the amount of the crushed object W3 drawn by the weigher 17, air volume of the primary fan 11 is adjusted. With this, amount of the secondarily crushed object W4 generated at the secondary crusher 9 and amount of the secondarily crushed object W4 drawn by the primary fan 11 are balanced to prevent air ratio at the transportation of the secondarily crushed object W4 by air from widely fluctuating and to reduce power consumption of the primary fan 11.

As described above, in this embodiment, a process from the secondary crushing to the injection into the burner is integrated, which makes a large volume tank for storing the secondarily crushed object W4 after the secondary crushing unnecessary, resulting in decreased facility cost. Especially, flows of the crushed object W3 and the secondarily crushed object W4 are controlled through the variety of control means 13 to 16, which allows amount of the crushed object W3 transported to be restricted in accordance with the volume of the intermediate tank 8 while stably and continuously proceeding processes until the secondary crushing. With this, a large reserve capacity of the intermediate tank 8 becomes unnecessary, so that it becomes possible to use a small scale tank, which remarkably reduces facility cost. In addition, since maximum amount of the secondarily crushed object W4, from which foreign matters are securely removed through processings before injection into the burner, can stably be injected, it becomes possible to efficiently process the inflammable waste W while preventing fluctuation of calorific value when fuel is used. Meanwhile, when the secondarily crushed object W4 is not immediately used as a fuel, a tank for storing the secondarily crushed object W4 can be installed as before.

Further, although in the above embodiment, both of the feed rate control of the inflammable waste W from the hopper 2 through the load control means 13 for crusher and the switching of operation/stoppage of the primary crusher 4 through the crushing control means 14 are carried out, it is possible to perform only either one of them.

Still further, in the above embodiment, as means for removing foreign matters before the primary crusher 4 is used the trommel 3. In place of the device, other foreign matter removing devices such as rotary screens, for instance, can be used. In the same manner, devices for removing foreign matters downstream of the primary crusher 4 are not limited to the magnetic ore dressing machine 6 and the vibrating conveyor 5, other removing devices can be used.

Further, the secondarily crushed object W4 that is a fuel manufactured by the inflammable waste fuelizing method of the present invention can be used as fuels by injecting them in furnaces through burners in a variety of combustion furnaces other than cement kilns.

Next, test examples on combustibility when the secondarily crushed object W4 is burnt with the kiln burner 10 will be explained.

Table 1 shows properties of crushed objects used for the test and pulverized coal used in comparative examples. Table 2 shows test results when they are burnt with the kiln burner 10. The tests were carried out twice.

TABLE 1

| | | FIRST TEST | | SECOND TEST | |
|---|---|---|---|---|---|
| | | EXAMPLE 1 | COMPARATIVE EXAMPLE 1 | EXAMPLE 2 | COMPARATIVE EXAMPLE 2 |
| COMPOSITION | | CRUSHED OBJECTS | PULVERIZED COAL 1 | CRUSHED OBJECTS | PULVERIZED COAL 2 |
| CALORIFIC VALUE | (kJ/kg) | 24240 | 27420 | 24240 | 27460 |
| | (kcal/kg) | 5790 | 6550 | 5790 | 6560 |
| SIZE | | <10 mm | 90 μmR 6.7% | <10 mm | 90 μmR 7.4% |
| VOLATILE MATTER (%) | | — | 30.3 | — | 29.6 |
| ASH (%) | | — | 10.2 | — | 17 |

TABLE 2

| | | FIRST TEST | | SECOND TEST | |
|---|---|---|---|---|---|
| | | EXAMPLE 1 | COMPARATIVE EXAMPLE 1 | EXAMPLE 2 | COMPARATIVE EXAMPLE 2 |
| CRUSHED OBJECTS FED TO KILN BURNER | FEED RATE (t/h) | 1.49 | 0 | 1.49 | 0 |
| | CALORIFIC VALUE (kJ/kg) | 24240 | | 24240 | |
| | HEAT CONSUMPTION (kJ/kg-cl) | (2) 218 | (1) 0 | (2) 230 | (1) 0 |
| PULVERIZE COAL FED TO KILN BURNER | FEED RATE (t/h) | 7.72 | 8.93 | 7.52 | 8.8 |
| | CALORIFIC VALUE (kJ/kg) | 27420 | | 27460 | |
| | HEAT CONSUMPTION (kJ/kg-cl) | (4) 1275 | (3) 1475 | (4) 1315 | (3) 1529 |
| COMBUSTION CONTRIBUTION RATIO (%) | | 92 | | 93 | |

As shown in Table 1, the crushed objects are proved to have high calorific value that is approximately 90% of that of the pulverized coal. Then, when the crushed objects are injected into the kiln burner 10 together with the pulverized coal and burnt therein, as shown in Table 2, it is proved that combustion contribution ratio of the crushed objects is between 92% and 93%, so that the crushed objects efficiently function as a fuel. A formula for calculating the combustion contribution ratio is as follows.

Combustion contribution ratio (%)=decrease of pulverized coal heat consumption/increase of crushed objects heat consumption=((3)−(4))×100/((2)−(1))

Meanwhile, in the above examples 1, 2, there were anxieties that amount of air for injecting the crushed objects into the kiln burner 10 through the primary fan 11 (shown in FIG. 1) became excessive so that heat loss occurred, however, even under such conditions, the high contribution ratio was achieved, which means that properly adjusting the air volume can further improve the contribution ratio.

EXPLANATION OF REFERENCE NUMBERS 1 apparatus for fuelizing inflammable waste
2 hopper
3 trommel
4 primary crusher
5 vibrating conveyor
5a screen
6 magnetic ore dressing machine
7 foreign matter removing device
8 intermediate tank
9 secondary crusher
10 kiln burner
11 primary fan
12 secondary fan
13 load control means for crusher
14 crushing control means
15 supply/over-load-prevention control means
16 proportional control means for air-volume
17 weigher
32 rotary blades
33 shank
34 blades
35 (35A, 35B) main body
36 screen
37 fixed blades
38 rotary shaft
41 main body
42 rotary blades
43 shank
44 blades
46 screen
47 fixed blades
C pulverized coal
F foreign matter
I non-ferrous foreign matter
M iron-based foreign matter
W, W1 inflammable waste
W2, W3 crushed object
W4 secondarily crushed object

What is claimed is:

1. An apparatus for fuelizing inflammable waste comprising:
    a primary crusher for crushing an inflammable waste containing as principal component at least one selected from a group comprising plastics, sponges, fibers, rubbers and wood materials;
    a foreign matter removing device for removing foreign matters contained in said crushed objects;
    an intermediate tank in communication with the primary crusher for receiving crushed objects by the primary crusher, the intermediate tank being adapted to generate a tank load signal associated with a load of the intermediate tank;
    a secondary crusher in communication with the intermediate tank to receive crushed objects from the intermediate tank for secondarily crushing said crushed objects from which foreign matters are removed, the secondary crusher being adapted to generate a secondary crusher load signal associated with a load of the secondary crusher;
    a crushing controller in operative communication with the primary crusher, the intermediate tank, and the secondary crusher, wherein said crushing controller:
    receives the tank load signal from the intermediate tank;
    generates a primary, crusher signal based on the tank load signal, and transmit the primary crusher signal to the primary crusher to control operation of the primary crusher; and
    generates a secondary crusher signal based on the tank load signal, and transmit the secondary crusher signal to the secondary, crusher to control operation of the secondary
    a secondary supply controller in communication with the intermediate tank and the secondary crusher, the secondary supply controller receives the secondary crusher load signal from the secondary crusher, generates a tank control signal based on the secondary crusher load signal, and transmits the tank control signal to the intermediate tank to control amount of crushed objects discharged from the intermediate tank;
    an injecting device for injecting said secondarily crushed objects into a burner;
    wherein said primary crusher is provided with rotary blades mounted on a rotary shaft in a main body in multiple stages in an axial direction of the rotary shaft, fixed blades fixed in the main body and a screen disposed below the rotary blades, and said primary crusher crushes the inflammable waste with the rotary blades and the fixed blades, and downwardly discharging crushed objects through said screen, and at the crushing of the inflammable waste, said primary crusher is driven under following conditions:
    a velocity of the rotary blade being not less than 20 rpm and not more than 60 rpm, said velocity of the rotary blade determining the velocity of the primary crusher;
    a phase difference of the rotary blades in two adjacent stages being not more than 60°;
    sieve openings of the screen being not less than 30 mm and not more than 200 mm; and
    a distance between the screen and the rotary blades being not less than 20 mm and not more than 100 mm;
    wherein objects reaching below sieve openings of said screen are discharged downward through the sieve openings, and crushed objects larger or equal to the sieve openings are lifted upwards by the rotary blades and repeatedly crushed.

2. The apparatus for fuelizing inflammable waste as claimed in claim 1 wherein the intermediate tank is configured for storing said crushed objects from which foreign matters are removed by the foreign matter removing device.

3. The apparatus for fuelizing inflammable waste as claimed in claim 1 or 2, wherein said secondary crusher is provided with rotary blades mounted on a rotary shaft in a main body, fixed blades fixed in the main body and a screen disposed below the rotary blades, and said secondary crusher secondarily crushes the crushed objects from which foreign matters are removed with the rotary blades and the fixed blades, and downwardly discharges the secondarily crushed objects thorough said screen, and at the secondary crushing of the crushed objects, said secondary crusher is driven under following conditions:
- a velocity of the rotary blades being not less than 60 rpm and not more than 600 rpm;
- sieve openings of the screen being not less than 5 mm and not more than 20 mm; and
- a distance between the screen and the rotary blades being not less than 10 mm and not more than 50 mm.

4. The apparatus for fuelizing inflammable waste as claimed in claim 1, wherein said foreign matter removing device comprises a vibrating conveyor having a filtering function, on a conveying face, of filtering conveyed objects by allowing objects smaller than a predetermined size to drop, and a magnetic ore dressing machine, situated above said vibrating conveyor, for removing iron-based foreign matters with a magnet.

5. The apparatus for fuelizing inflammable waste as claimed in claim 4, wherein on said conveying face of the vibrating conveyor is arranged a screen, a porous plate or a plate-like member with plurality of slits.

6. The apparatus for fuelizing inflammable waste as claimed in claim 4, wherein on said conveying face of the vibrating conveyor is arranged a screen, and sieve openings of said screen are not less than 1 mm and not more than 50 mm.

7. The apparatus for fuelizing inflammable waste as claimed in claim 4, wherein on said conveying face of the vibrating conveyor is arranged a porous plate, and diameters of pores drilled in said porous plate are not less than 1 mm and not more than 50 mm.

8. The apparatus for fuelizing inflammable waste as claimed in claim 4, wherein on said conveying face of the vibrating conveyor is arranged a plate-like member with plurality of slits, and a width of each slit is not less than 1 mm and not more than 50 mm.

9. The apparatus for fuelizing inflammable waste as claimed in claim 1, further comprising a trommel upstream of the primary crusher for removing foreign matters from the inflammable waste before the inflammable waste is supplied to the primary crusher.

10. The apparatus for fuelizing inflammable waste as claimed in claim 1, further comprising a primary crusher load controller in operative communication with the primary crusher and configured to control an amount of inflammable waste supplied to the primary crusher in accordance with a load of the primary crusher.

11. The apparatus for fuelizing inflammable waste as claimed in claim 1, wherein the crushing controller ceases operation of the secondary crusher when the level of crushed object present in the intermediate tank passes a prescribed threshold.

\* \* \* \* \*